United States Patent [19]

Linn

[11] 4,222,231

[45] Sep. 16, 1980

[54] ENGINE

[76] Inventor: Wallace L. Linn, 6705 Grosvenor Pl., Indianapolis, Ind. 46220

[21] Appl. No.: 926,249

[22] Filed: Jul. 20, 1978

[51] Int. Cl.³ ............................................. F02C 5/00
[52] U.S. Cl. .................. 60/39.45; 60/39.76; 60/727
[58] Field of Search .............. 60/39.45, 39.6, 39.76; 123/234, 236, 237, 238

[56] References Cited

U.S. PATENT DOCUMENTS

| 969,221 | 9/1910 | Thompson | 60/39.63 X |
|---|---|---|---|
| 3,175,359 | 3/1965 | Szlechter | 60/39.45 |
| 3,932,987 | 1/1976 | Munzinger | 60/39.63 X |

FOREIGN PATENT DOCUMENTS

| 448649 | 5/1948 | Canada | 60/39.6 |
| 917953 | 1/1947 | France | 60/39.45 |

*Primary Examiner*—Carlton R. Croyle
*Assistant Examiner*—Edward Look
*Attorney, Agent, or Firm*—Jenkins, Coffey, Hyland, Badger & Conard

[57] ABSTRACT

An engine includes a generally cylindrical housing divided into inlet, combustion chamber, and power housing portions. A shaft is rotatably mounted in the housing. A compressor element is mounted on the shaft for rotation in the inlet portion, an intake and exhaust valve rotor element is mounted on the shaft for rotation in the combustion chamber portion, and a power element is mounted on the shaft for rotation in the power housing. The valve rotor is provided to regulate the flow of compressed air into and out of the combustion chamber. Fuel injection and ignition are suitably timed to occur generally between intake valve closing and exhaust valve opening. Combustion products exit through the exhaust valve into the power rotor. These products rotate the power rotor to drive the compressor and valve rotors. The working surfaces of the compressor and power rotors are helices. The pitch of the compressor rotor helix decreases between the inlet end of the housing and the combustion chamber. The pitch of the power rotor helix increases from the exhaust valve toward an exhaust port. A compressed air storage, or accumulator, portion is provided between the inlet portion and the combustion chamber portion of the housing. A reed valve separates the accumulator from the compressor housing portion to provide a more constant pressure source for the engine at higher operating speed.

9 Claims, 6 Drawing Figures

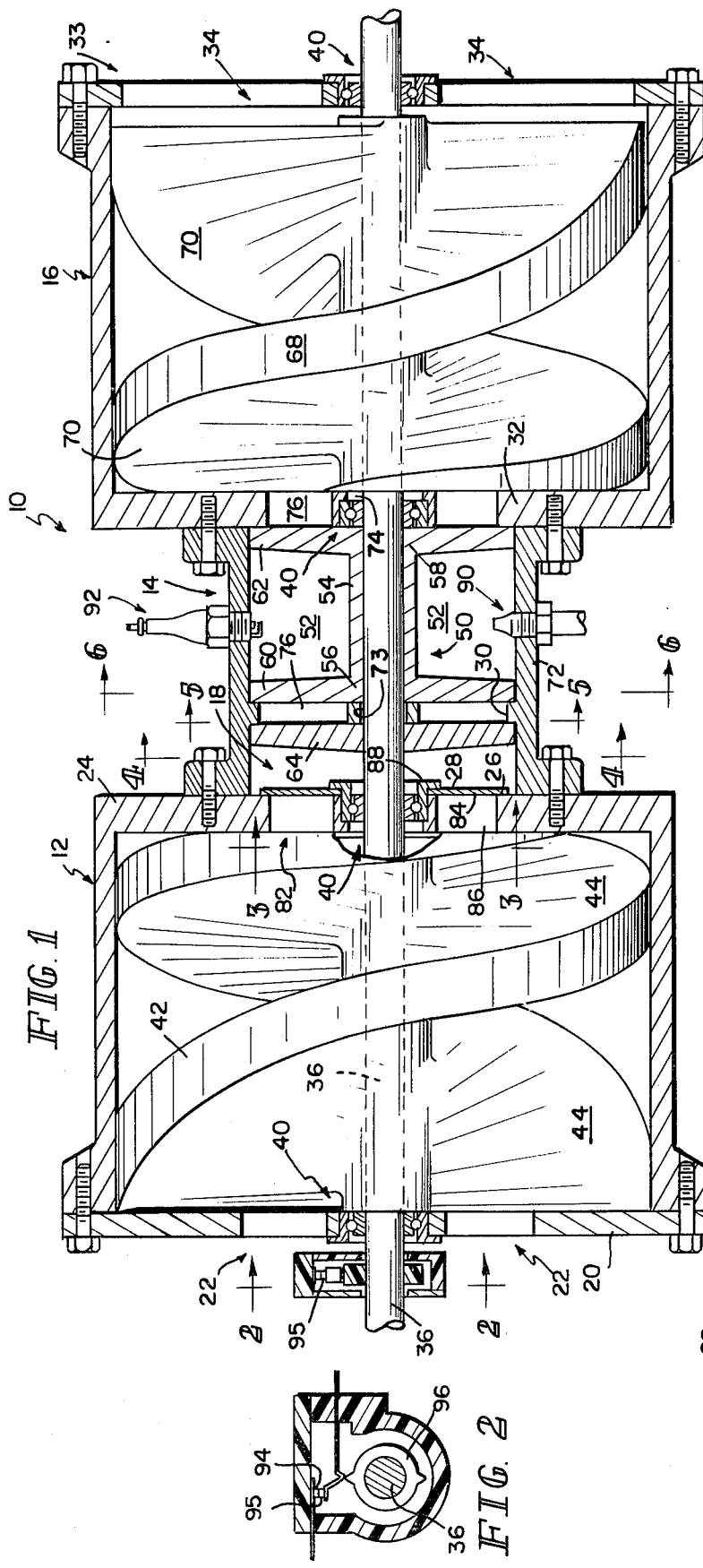
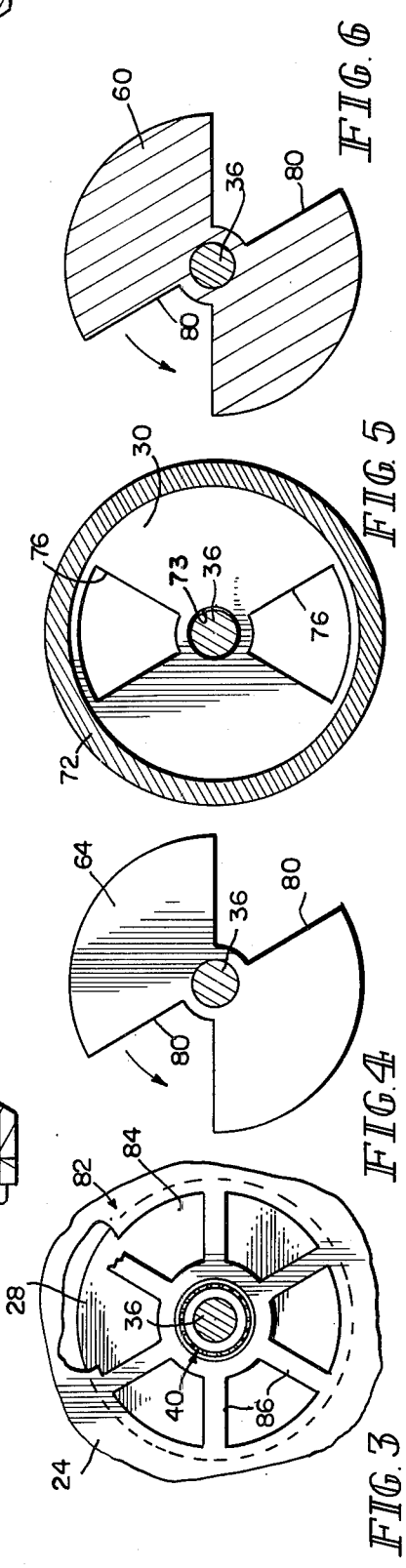

ENGINE

This invention relates to engines, and particularly to an engine having a central output shaft, a compressor at its inlet end, a turbine at its outlet end and a combustion chamber between the compressor and turbine.

Certain types of engines having compressors on their input ends which are driven through drive shafts from turbines on their output ends are known. The turbine is driven due to the expansion of hot combustion products generated in a combustion chamber between the compressor and turbine. Examples of such engines are conventional turbine engines, such as trubojet engines. The compressors of such engines supply compressed air to the combustion chambers with no intermediate valves. No valves are provided between the combustion chambers and the turbine wheels of such engines. As a result, the output speeds (rpm) of such engines are very high. In turbojet engines, this is not a critical problem, the sole output of such engines is expanding hot combustion products. However, in turbines for automotive purposes and in turboprops, large, bulky and costly speed-reducing transmissions are required to reduce the turbine output speed to drive vehicle wheels, or, in the case of a turboprop engine, a propeller.

It is an object of the present invention to provide an engine comprising, in series, an inlet housing portion, a combustion chamber housing portion, and a power housing portion, which is capable of providing substantially lower output rpm than a conventional turbine engine.

According to the present invention, an engine includes, in series, an inlet, or compressor, housing portion, a combustion chamber housing portion, and a power housing portion. The inlet housing portion provides a combustion-supporting air inlet and the power housing portion provides an exhaust port. An engine shaft is mounted for rotation within the housing portions to extend longitudinally through all three. A compressor element is mounted on the shaft and is driven rotatably in the inlet housing portion. A power element, or turbine wheel, is mounted on the shaft in the power housing portion to drive the compressor element. A valve rotor element is mounted for rotation by the shaft in the combustion chamber.

The valve rotor element includes upstream and downstream disks rotatable with the shaft and provided with one or more sectors or openings each. These upstream and downstream disks cooperate with upstream and downstream walls in the combustion chamber housing portion to define intake and exhaust valves, respectively. To this end, cooperating sectors or openings are provided in the upstream and downstream walls. The openings in the upstream wall and upstream disk cooperate alternately to open and close a path for combustion-supporting air between the compressor housing portion and the combustion chamber housing portion. The openings in the downstream disk and downstream wall cooperate alternately to open and close a path for the hot expanding combustion product gases from the combustion chamber into the power housing portion.

Each of the inlet compressor and power elements desirably includes a helical working surface "wound" about the shaft. The helical working surface of the compressor element has a pitch which decreases from the inlet end toward the combustion chamber housing portion. The power element helical working surface has a pitch which increases from the end of the power housing portion adjacent the combustion chamber housing portion toward the exhaust port.

More specifically, each of the illustrative compressor element and power element includes two helical working surfaces disposed 180° apart about the shaft. However, it should be understood that any number of helical working surfaces may be provided, and they may be spaced equally or unequally about the shaft to suit the needs of a particular application.

Desirably, an accumulator chamber portion is provided between the inlet housing portion and the combustion chamber housing portion to store compressed combustion-supporting air. The accumulator chamber illustratively permits one-way flow only from the inlet housing portion toward the combustion chamber portion by means of a reed valve.

The invention may best be understood by referring to the following description and accompanying drawings which illustrate the invention. In the drawings:

FIG. 1 is a sectional side elevational view of an engine constructed according to the present invention;

FIG. 2 is a fragmentary sectional view of a detail of the engine shown in section in FIG. 1, taken generally along section lines 2—2 thereof;

FIG. 3 is a fragmentary sectional view of the engine shown in section in FIG. 1, taken generally along section lines 3—3 thereof;

FIG. 4 is a fragmentary sectional view of the engine shown in section in FIG. 1, taken generally along section lines 4—4 thereof;

FIG. 5 is a fragmentary sectional view of the engine shown in section in FIG. 1, taken generally along section lines 5—5 thereof; and FIG. 6 is a fragmentary sectional view of the the engine shown in section in FIG. 1, taken generally along section lines 6—6 thereof.

The invention may be understood generally by reference to FIG. 1. In FIG. 1, an engine housing 10 which is generally right circular cylindrical in cross section, is divided into an inlet, or compressor, housing portion 12, a smaller diameter combustion chamber housing portion 14, and a power, or turbine, housing portion 16. An accumulator, or compressed air storage, portion 18 is disposed between portions 12, 14 and has generally the same cross-sectional diameter and area as the combustion chamber portion 14. It should be noted that no cooling means, such as water jackets or air cooling fins, are provided, but that such can be provided as needed for a particular application.

Portion 12 is provided with an inlet end wall 20 defining one or more combustion-supporting air inlets 22. Portion 12 further includes an annular wall 24 providing a seat 26 for a circular, reed-type valve 28. An annular wall 30 is provided between portions 18, 14. An annular wall 32 is provided between portions 14, 16. The outlet, or exhaust, end wall 33 of housing portion 16 is provided with one or more exhaust ports 34.

An engine shaft 36 extends axially through each of housing portions 12, 14, 16, 18 and is suitably journalled for rotation in bearings 40 to provided in walls 20, 24, 32, 33. A compressor element, or rotor, 42 is attached to shaft 36 in portion 12. Rotor 42 is provided with a pair of working surfaces 44 disposed generally symmetrically 180° apart about shaft 36. The working surfaces 44 are in the form of helical spirals with pitches that decrease from the inlet end wall 20 toward wall 24.

A spool-shaped valve rotor 50 is keyed or otherwise suitably attached to shaft 36 and positioned between walls 30, 32. Rotor 50 provides an annular combustion chamber 52 around a center portion 54 of rotor 50. The upstream and downstream ends 56, 58, respectively, of portion 54 support flange-like intake and exhaust valve disks 60, 62, respectively. An additional disk 64 is provided upstream from wall 30 to seal the first valve provided by disks 60, 64 and wall 30 from the upstream side. Disk 64 is fixed to shaft 36 in the same manner as rotors 42, 50.

The power housing portion 16 houses a power, or turbine, rotor 68. Power rotor 68 is provided with working surfaces 70 in the configuration of a double helix, the pitch of which increases from the second valve, provided by wall 32 and disk 62, toward the exhaust ports 34.

The configurations of the first and second valves may best be seen by referring to FIGS. 4–6. Walls 30, 32 are both configured generally as illustrated in FIG. 5, with the surrounding combustion chamber portion 14 wall 72, and the output shaft 36 extending through the central circular openings 73, 74 in walls 30, 32, respectively. In the illustrated embodiment, a bearing 40 is provided in wall 32, while clearance exists between wall 30 and shaft 36. While no seals are illustrated between openings 73, 74 and shaft 36, it is understood that such seals could be provided. With the illustrated construction, however, such seals are not essential.

Each of walls 30, 32 is provided with two diametrically opposed sectoral openings 76. Each opening 76 extends for approximately 60° about the peripheries of walls 30, 32. It is to be understood that the sectoral openings 76 in wall 30 may or may not be axially aligned with those of wall 32, depending upon other design factors such as fuel injection timing, ignition timing, desired engine rpm range, etc.

The constructions of the first valve means disks 60, 64 and second valve means disk 62 may best be understood by reference to FIGS. 4 and 6. As seen in these Figs., each of disks 60, 64 is fixed to shaft 36 for rotation therewith. Disks 60, 64 include axially aligned, diametrically opposed sectoral openings 80, each of which extends peripherally approximately 60°. It will be appreciated that for certain orientations of disks 60, 64, every 180° of rotation of shaft 36, openings 80, 76 will be aligned, at least partially, for 120° of rotation of shaft 36. Passageways will thus be provided between the accumulator 18 and the combustion chamber 52. A charge of combustion-supporting air is introduced into combustion chamber 52. It should be understood, of course, that for particular engine parameters, such as operating rpm, and output torque and horsepower, it may be desirable to provide larger or smaller openings 76, 80, or to provide a single opening in either one or the other of disks 60, 64 or wall 30, or both.

The second valve means wall 32 and disk 62 have the same configurations as wall 30 and disk 60, respectively. That is, wall 32 provided with sectoral openings 76 (see FIG. 1) configured similarly to openings 76 illustrated in FIG. 5. Disk 62, which is identical in construction to disk 60 and disk 64, includes sectoral openings 80, (not shown). The openings 80 in disk 62 are not necessarily in axial alignment with those in disks 60, 64, depending upon engine timing and other considerations. It should be understood that, while portion 54 is illustrated as being a smooth, smaller diameter portion of rotor 50, portion 54 could be configured to provide, for example, radially extending flow barriers between the openings 80 in disks 60, 62 to provide the desired flow characteristics, e.g., turbulence or vortex flow of combustion-supporting air about portion 54.

The accumulator 18 is provided between the inlet compressor housing 12 and the combustion chamber housing 14 to establish a substantially uniform pressure compressed air storage from which combustion-supporting air is drawn. A reed valve 82 (FIGS. 1, 3) consisting of a disk-shaped flexible metal diaphragm 84 is supported against the downstream side of a spider 86. When the pressure differential across the reed valve 82 exceeds a predetermined level, the diaphragm 84 flexes away from the spider 86 permitting the charge of combustion-supporting air in accumulator 18 to be replenished. The bearing 40 supported in the spider 86 includes a locking flange 88 at its rearward extent to hold the center of diaphragm 84 against the spider 86.

A double helix is used on each of the compressor rotor 42 and power rotor 68 in order to provide balanced diametric forces against the working surfaces 44, 70 of these rotors. Such balanced forces center the rotors 42, 68 in their housings 12, 16 and aid to minimize leakage between the periphery of each rotor and its respective housing portion. Of course, other numbers of working surfaces could be used to accomplish the same result. The only requirement for such centering is that the working surfaces be peripherally equally spaced about shaft 36. Importantly, the rotors 42, 50, 68 run close to, but do not contact, the walls of their respective housings 12, 14, 16. No seals are required in the disclosed embodiment.

In operation, combustion-supporting air drawn into inlets 22 is compressed in housing 12 by the double helix rotor 42. The compressed air enters the accumulator 18 through reed valve 82. Reed valve 82 operates upon a constant pressure differential, and under steady-state operating conditions acts as a pressure regulator valve in that it opens at a predetermined pressure differential to permit compressed air to enter the accumulator 18, and closes when the pressure differential is lower. The air from accumulator 18 is then conducted at timed intervals through openings 76, 80, into combustion chamber 52. While it is understood that a carburetor could be attached by conventional means to inlet end wall 20, the instant embodiment is provided with fuel through a fuel injector nozzle 90. The injection of fuel into the combustion-supporting air in chamber 52 is properly timed to occur at about the time the first valve 30, 60, 64 closes. At approximately the same time, the fuel/air mixture is ignited by the spark plug 92. In this regard, a set of shaft 36 driven ignition breaker points 94, 95 may be provided as illustrated in FIG. 2. The movable breaker point 95 is spring-mounted to be urged away from the fixed point 94. A two-lobe cam 96 mounted on shaft 36 times the contact 94, 95 breaks through a coil-type, or solid state, ignition system (not shown) to insure that the spark occurs across the electrodes of spark plug 92 when a combustible fuel/air charge is in combustion chamber 52 and valves 30, 60, 64 and 32, 62 are closed. The combustible fuel/air mixture can be ignited slightly before the first valve 30, 60, 64 closes or slightly after the second valve 32, 62 opens, depending upon the desired engine operating parameters.

After ignition, the second valve 32, 62 opens, permitting the expanding combustion products from combustion chamber 52 to pass through second valve 32, 62 and exert force due to expansion against the working surfaces 70 of power rotor 68. Due to the pitches of the power rotor 68 heklices, expansion of the combustion products drives the power rotor 68 and output shaft 36 for rotation. The expanding combustion product gases provide torque through the rotor 68 as the combustion products move toward the exhaust ports 34.

While the illustrated engine shows compressor and power rotors of the same diameter, in certain application, it may be desirable to have one larger than the other. Further, although each helix, or working surface 44, 70 of the compressor and power rotors 42, 68, respectively, has only approximately 360° length, longer or shorter numbers of turns of the working surfaces 44, 70 may be desirable for a particular application. Fans may be desirable to augment the air into the compressor 12 or accumulator 18. Liquid or forced air may be used to cool the combustion chamber portion 14 and power housing portion 16, if necessary, in accordance with known techniques. The entire rotating mechanism of the engine is supported only by two sets of bearings in the center and bearings at each end. This is the only physical contact between the rotating parts of the engine and the housings. The engine takes advantage of the labyrinth sealing effect provided by the working surfaces 44, 70 of rotors 42, 68, respectively. Either gaseous or liquid fuel may be used. In an aircraft or other forward-moving vehicle, ram air techniques may also be used to augment the compression provided by compressor rotor 42. The compressor including rotor 42 need not be of the type shown. It may, for example, be a centrifugal or other type of compressor.

What is claimed is:

1. An engine comprising: a housing including, in series, an inlet housing portion, a combustion chamber housing portion, the inlet housing portion defining a combustion-sustaining gas inlet end and an end adjacent the combustion chamber housing portion, and a power housing portion, the power housing portion defining an end adjacent the combustion chamber housing portion and an exhaust end; an engine shaft mounted for rotation within the housing; an inlet compressor element mounted for rotation in the inlet housing to compress combustion-sustaining gas for the engine; a power element mounted for rotation with the shaft in the power housing; first valve means for controlling the flow from the compressor housing into the combustion chamber housing; second valve means for controlling flow from the combustion chamber housing into the power housing; means for introducing fuel into the combustion chamber housing; means for igniting a fuel-gas mixture in the combustion chamber housing; and an accumulator for storing compressed combustion-sustaining gas, the accumulator being positioned between the inlet housing and the combustion chamber housing.

2. The engine of claim 1 and further comprising a third valve disposed between the inlet housing and the accumulator chamber.

3. The engine of claim 2 wherein the third valve is a reed-type valve.

4. An engine comprising: a housing including, in series, an inlet housing portion, a combustion chamber housing portion, the inlet housing portion defining a combustion-sustaining gas inlet end and an end adjacent the combustion chamber housing portion, and a power housing portion. The power housing portion defining an end adjacent the combustion chamber housing portion and an exhaust end; an engine shaft mounted for rotation within the housing; an inlet compressor element mounted for rotation in the inlet housing to compress combustion-sustaining gas for the engine; a power element mounted for rotation with the shaft in the power housing; first valve means for controlling the flow from the compressor housing into the combustion chamber housing, the first valve means comprising a shutter valve, a movable part of which is provided by a valve rotor mounted within the combustion chamber housing for rotation with the shaft, and a stationary part of which is provided by the combustion chamber housing, the movable and stationary parts cooperating alternately to open and close the first valve means to permit and prevent, respectively, the flow of combustion-supporting gas into the combustion chamber; second valve means for controlling flow from the combustion chamber housing into the power housing, means for introducing fuel into the combustion chamber housing; and means for igniting a fuel-gas mixture in the combustion chamber housing.

5. An engine comprising: a housing including, in series, an inlet housing portion, a combustion chamber housing portion, the inlet housing portion defining a combustion-sustaining gas inlet end and an end adjacent the combustion chamber housing portion, and a power housing portion, the power housing portion defining an end adjacent the combustion chamber housing portion and an exhaust end; an engine shaft mounted for rotation within the housing; an inlet compressor element mounted for rotation in the inlet housing to compress combustion-sustaining gas for the engine; a power element mounted for rotation with the shaft in the power housing; first valve means for controlling the flow from the compressor housing into the combustion chamber housing; second valve means for controlling flow from the combustion chamber housing into the power housing, the second valve means comprising a shutter valve, a movable part of which is provided by a valve rotor mounted within the combustion chamber housing for rotation with the shaft and a stationary part of which is provided by the combustion chamber housing, the movable and stationary parts cooperating alternately to open and close the second valve means to permit and prevent, respectively, the flow of combustion products from the combustion chamber; means for introducing fuel into the combustion chamber housing; and means for igniting a fuel-gas mixture in the combustion chamber housing.

6. An engine comprising, in series, an inlet housing portion, a combustion chamber housing portion, the inlet housing defining an air inlet end and an end adjacent the combustion chamber housing portion, and a power housing portion, the power housing portion defining an end adjacent the combustion chamber housing portion and an exhaust end, an engine shaft mounted for rotation within the engine, an inlet compressor element mounted on the shaft for rotation in the inlet housing to compress air for the engine, a power element mounted on the shaft for rotation in the power housing, and a valve rotor mounted on the shaft for rotation in the combustion chamber housing, the valve rotor including a first, or upstream, valve disk and a second, or downstream valve disk, the engine further including upstream wall means cooperating with the first valve disk for controlling the flow from the compressor housing into the combustion chamber housing, and downstream wall means cooperating with the second valve disk for controlling flow from the combustion chamber housing into the power housing, means for introducing fuel into the combustion chamber housing, and means for igniting a fuel-gas mixture in the combustion chamber housing.

7. The engine of claim 6 wherein the inlet compressor element includes a plurality of helical working surfaces disposed peripherally substantially equally about the shaft, the pitches of the helices of the inlet compressor working surfaces decreasing from the inelt end toward the combustion chamber housing.

8. The engine of claim 6 or 7 wherein the power element includes a plurality of helical working surfaces disposed peripherally substantially equally about the shaft, the pitches of the helices of the power element working surfaces increasing from the end adjacent the combustion chamber housing toward the exhaust end.

9. The engine of claim 8 and further comprising an accumulator for storing compressed air, the accumulator being positioned between the inlet housing and the combustion chamber housing, and a third valve disposed between the inlet housing and the accumulator chamber.

* * * * *

UNITED STATES PATENT AND TRADEMARK OFFICE
CERTIFICATE OF CORRECTION

PATENT NO. : 4,222,231
DATED : September 16, 1980
INVENTOR(S) : Wallace L. Linn

It is certified that error appears in the above-identified patent and that said Letters Patent are hereby corrected as shown below:

Column 1, line 20, insert -- since -- before "the".
Column 2, line 16, insert -- housing -- after "chamber" and before "por-"; line 35, cancel "the" (last occurrence); line 62, cancel "to".
Column 3, line 53, correct the spelling of "horsepower"; line 59, after "wall 32" insert -- is --.
Column 5, line 3, correct the spelling of "helices"; line 66 (Claim 4, line 6), change the line to read -- housing portion, the power housing portion defining --.
Column 6, line 17 (Claim 4, line 25), change the comma to a semicolon.
Column 7, line 9 (Claim 7, line 5), correct the spelling of "inlet".

Signed and Sealed this

Twenty-eighth Day of April 1981

[SEAL]

Attest:

RENE D. TEGTMEYER

Attesting Officer

Acting Commissioner of Patents and Trademarks